Dec. 22, 1959  R. M. NELSON  2,917,835
PHOTO GEOMETRY MODELS
Filed Feb. 27, 1958  2 Sheets-Sheet 1

INVENTOR
RAYMOND M. NELSON
BY
ATTORNEYS

INVENTOR
RAYMOND M. NELSON
BY
ATTORNEYS

United States Patent Office 2,917,835
Patented Dec. 22, 1959

2,917,835

PHOTO GEOMETRY MODELS

Raymond M. Nelson, Gainesville, Va.

Application February 27, 1958, Serial No. 718,096

2 Claims. (Cl. 35—8)

(Granted under Title 35, U.S. Code (1952), sec. 266)

The invention described herein may be manufactured and used by or for the Government of the United States of America for governmental purposes without the payment of any royalties thereon or therefor.

The present invention relates to a method of and apparatus for teaching the basic concepts of a photograph in relation to object space by the use of interlocking, transparent plastic planes erected on a platform.

In the training of students in the interpretation of photographs, it is necessary that the students have a thorough visualization of perspective and the three-dimensional effect. Early attempts at teaching the basic concepts, by means of the usual perspective diagrams, were disappointing because of student difficulty in visualizing three-dimensional space. Moreover, prior teaching methods usually consisted of making replicas of materials cemented together into flimsy and bulky models which were easily broken. It was also a problem to store permanently assembled models since this required a large amount of space.

In order to overcome these deficiencies, subject invention uses models formed of slotted, interlocking plastic sheets to illustrate the three-dimensional concept. The sheets are mounted on an opaque platform and designed to be assembled and disassembled easily.

An object of the present invention is to serve as a training aid in teaching three-dimensional geometry.

Another object is to provide plastic sheets to illustrate the three-dimensional concept of a photograph.

A further object is to provide an efficient and stable interlock between the various transparent sheets which may be readily disengaged.

Figure 1:
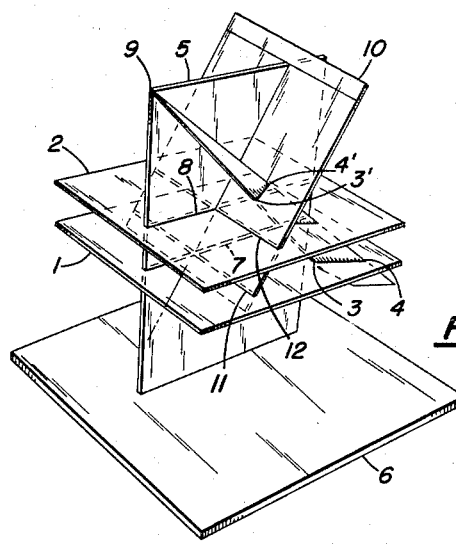
Figure 2:
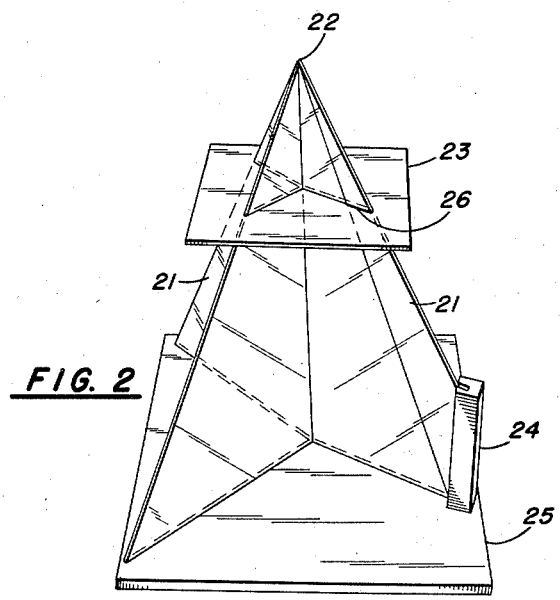

Other objects and many of the attendant advantages of this invention will be readily appreciated as the same becomes better understood by reference to the following detailed description when considered in connection with the accompanying drawings wherein:

Fig. 1 is a perspective view of a model illustrating the geometry of an oblique photograph, Fig. 2 shows the use of a model in illustrating the geometry of a vertical photograph and Figs. 3–6 show examples of of individual slotted sheets prior to assembly.

Referring now to the drawings, wherein like reference characters designate like or corresponding parts, there is shown in Fig. 1 an assembled model which illustrates the geometry of an oblique photograph. Each of the various planes required in the geometrical analysis of a photograph are represented by transparent sheets having slots therein for interlocking engagement with each other. For example, the plane of the map and the equivalent vertical photograph are represented by plastic sheets 1, 2 respectively and points 3, 4 on the sheet 1 represent vertical objects on said map. A sheet 5 mounted on a platform 6 represents a vertical plane intersecting planes 1, 2 at 7, 8 respectively. The rear nodal point of a camera lens, designated numeral 9, is that point which is located at the intersection of the emerging ray (extended if necessary) with the axis of the lens and is intended to represent the position from which a photograph is taken. An oblique photograph taken from point 9 would project the images 3, 4 from plane 1 to an equivalent oblique plane represented by sheet 10, the latter sheet intersecting with sheets 1 and 2 and forming scale lines 11, 12 at said intersections. Vertical objects 3, 4 on map plane 1 are thus represented on map plane 1, photo plane 2 and oblique plane 10 by the intersection of the line of sight from point 9 to the respective planes. Thus, points 3, 4 are projected on sheet 10 as points 3', 4' respectively. By the use of different colors for the various planes, the student is able to visualize the three-dimensional concept of the geometrical aspects of photography in a manner not possible prior to this invention.

Figure 4:
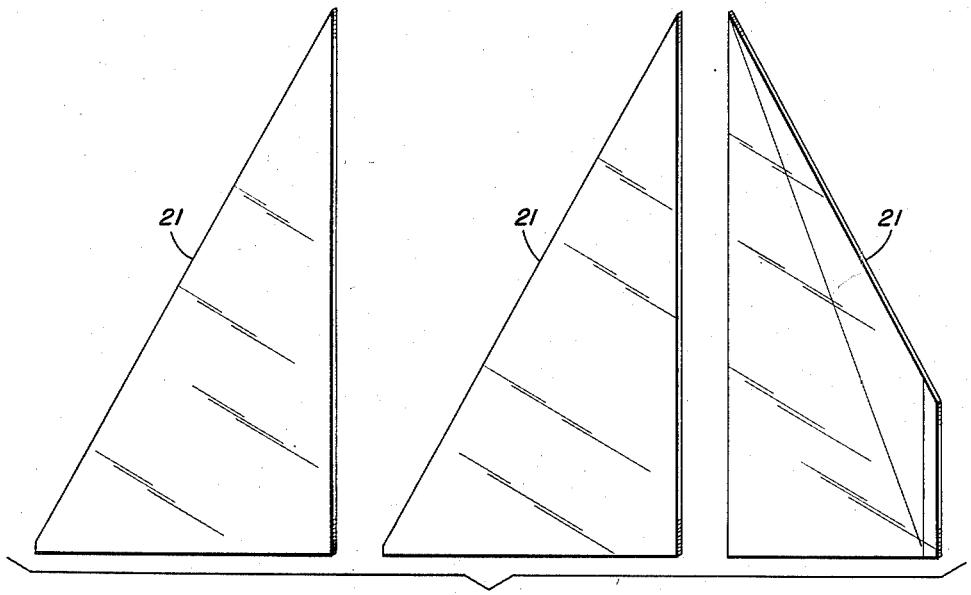
Figure 5:
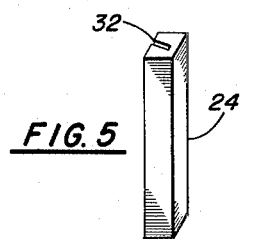
Figure 3:
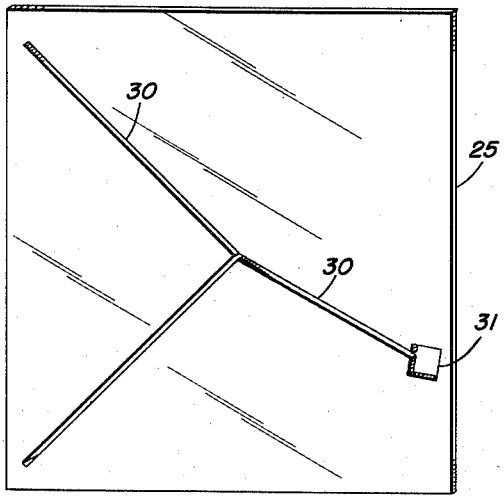
Figure 6:
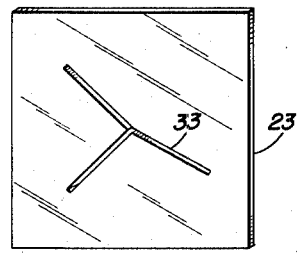

In Fig. 2, a series of plastic sheets are shown mounted to represent the geometry of a vertical photograph in which sheets 21 represent lines of sight from the rear nodal point of a camera lens located at point 22. The plane of the photograph is represented by sheet 23. A rectangular block 24 representing a vertical object positioned on datum plane 25 is thus represented by line 26 on sheet 23. Obviously, the plastic sheets may be formed into innumerable positions to illustrate various geometrical aspects. The above models are described above merely by way of example. The various sheets which make up the model shown in Fig. 2 are shown in their disassembled parts in Figs. 3–6. In Fig. 3, the plastic sheet 25, which forms the datum plane of the model, is comprised of slots 30 and square hole 31 for the reception of sheets 21 and the rectangular block 24 respectively. The planes indicating lines of sight, as represented by plastic sheets 21, are shown in Fig. 4. The rectangular block 24 with a notch 32 therein is indicated in Fig. 5 and the plane of the photograph represented by sheet 23 is shown in Fig. 6. Slots 33 of appropriate length and angularity are made on sheet 23 for assembly purposes.

It is thus shown that various models may be assembled from transparent, slotted plastic sheets, thereby greatly facalitating the teaching of geometrical photography. The models may be readily assembled and dismantled, as shown exemplarily in Figs. 3–6, and storage of the disassembled models takes a small amount of space.

Obviously many modifications and variations of the present invention are possible in the light of the above teachings. It is therefore to be understood that within the scope of the appended claims the invention may be practiced otherwise than as specifically described.

What is claimed:

1. A device for illustrating the geometry of an oblique photograph, said device comprising a pair of transparent plastic sheets in spaced parallel relationship representing a plane of a map and a photograph respectively, said pair of sheets having slots therein, a slotted, rectangular third sheet normal to said parallel sheets and passing through said slots for representing a vertical plane, a fourth sheet lying oblique to said parallel sheets and said third sheet and passing through slots in said sheets for depicting an oblique plane, a corner of said rectangular third sheet representing a point at which a photograph is taken, points on said parallel and oblique sheets for representing images in their respective locations on said depicted planes, whereby visualization of the geometrical aspects of an oblique photograph is obtained.

2. A device for illustrating the geometry of a vertical photograph, said device comprising first and second sheets in parallel relation and each having slots therein, said sheets depicting a datum plane and photographic plane respectively, a block located on said first sheet for depicting a vertical object on a datum plane, said block having a longitudinal slot therein, a plurality of sheets for representing lines of sight from the rear nodal point of a camera lens to said datum plane, each of said latter sheets culminating in a common point depicting the rear nodal point of said camera lens, said latter sheets being fitted within the slots of the first and second sheets and one of said latter sheets being further fitted within the slot of said block, whereby visualization of the geometrical aspects of a vertical photograph is obtained.

References Cited in the file of this patent

FOREIGN PATENTS 18,481  Great Britain _____ Oct. 15, 1892